United States Patent
Tang et al.

(10) Patent No.: US 10,571,730 B2
(45) Date of Patent: Feb. 25, 2020

(54) SPLICED DISPLAY AND MENUFACTURING METHOD THEREOF

(71) Applicant: Wuhan China Star Optoelectronics Technology Co., Ltd., Wuhan, Hubei (CN)

(72) Inventors: Yuejun Tang, Hubei (CN); Dejiun Li, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 287 days.

(21) Appl. No.: 15/745,051

(22) PCT Filed: Dec. 13, 2017

(86) PCT No.: PCT/CN2017/116004
§ 371 (c)(1),
(2) Date: Jan. 15, 2018

(87) PCT Pub. No.: WO2019/085170
PCT Pub. Date: May 9, 2019

(65) Prior Publication Data
US 2019/0384084 A1    Dec. 19, 2019

(30) Foreign Application Priority Data
Oct. 31, 2017    (CN) .......................... 2017 1 1040923

(51) Int. Cl.
*G02F 1/1333*    (2006.01)
*G02F 1/1335*    (2006.01)

(52) U.S. Cl.
CPC ...... *G02F 1/13336* (2013.01); *G02F 1/13338* (2013.01); *G02F 1/133528* (2013.01); *G02F 1/133602* (2013.01); *G02F 2201/38* (2013.01)

(58) Field of Classification Search
CPC ......... G06F 2203/04103; G06F 3/0488; G02F 1/13338
See application file for complete search history.

(56) References Cited

U.S. PATENT DOCUMENTS

2013/0241954 A1* 9/2013 Yu .......................... G06F 3/1446
345/629
2013/0300684 A1* 11/2013 Kim ....................... G06F 3/0488
345/173
(Continued)

FOREIGN PATENT DOCUMENTS

CM    105759429 A    7/2016
CN    103918021 B    5/2016
(Continued)

*Primary Examiner* — Gerald Johnson
(74) *Attorney, Agent, or Firm* — Hemisphere Law, PLLC; Zhigang Ma

(57) ABSTRACT

The disclosure provides a spliced display, the spliced display including an array substrate with a plurality of spliced arrangement, a functional layer assembly arranged on the array substrate with a plurality of spliced arrangement, and a first functional layer arranged on an outer surface of the functional layer assembly, a projection of at least one of the first functional layer on the array substrate covers a plurality of the array substrates. The disclosure also provides a method of manufacturing a spliced display. In the disclosure, the independent assembly belonging to each screen in the spliced display are separately manufactured and assembled, and then assembled single-layer or multi-layer independent parts are attached on the auxiliary substrate in the splicing manner. Then, the common assembly made of common assembly is assembled on an independent part. After the auxiliary substrate is removed, the backlight module is assembled in the original.

18 Claims, 4 Drawing Sheets

(56) References Cited

U.S. PATENT DOCUMENTS

| | | | |
|---|---|---|---|
| 2014/0351748 A1* | 11/2014 | Xia | G06F 3/0481 |
| | | | 715/798 |
| 2017/0090230 A1 | 3/2017 | Yoon et al. | |
| 2017/0228042 A1* | 8/2017 | Yu | G06F 3/0487 |

FOREIGN PATENT DOCUMENTS

| | | |
|---|---|---|
| CN | 106409839 A | 2/2017 |
| WO | 2014/036736 A1 | 3/2014 |

\* cited by examiner

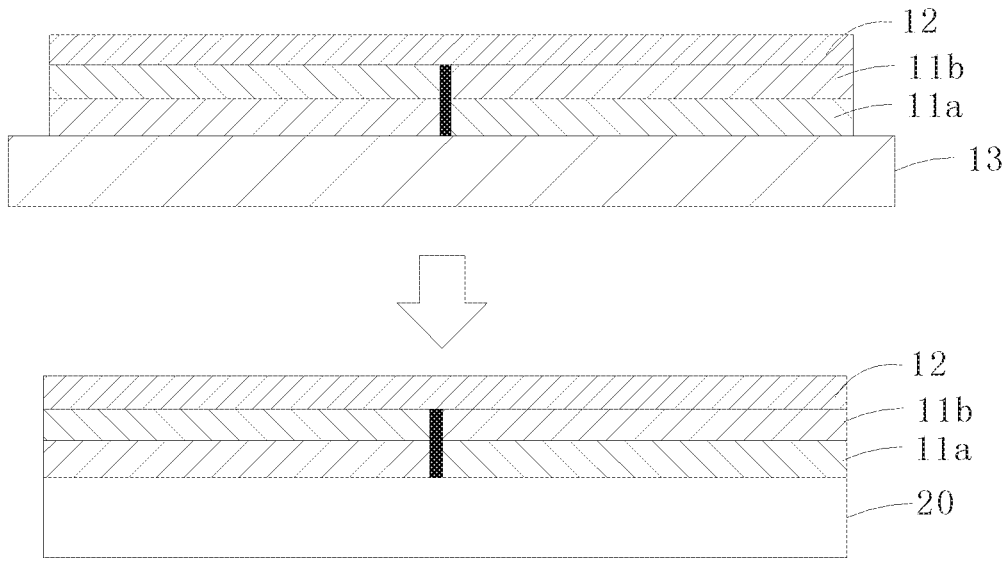

FIG. 2

```
manufacturing a plurality of array substrates, respective
structural part of a functional layer assembly and a layer of a    — S01
first transparent functional layer respectively
                        ↓
fixing the respective array substrates on an upper surface of
an auxiliary substrate for splicing and arranging the functional   — S02
layer assembly on the spliced array substrates
                        ↓
attaching the first functional layer on an outer surface of the
functional layer assembly and making a projection of the first
functional layer on the array substrates to cover all the array    — S03
substrates
                        ↓
removing the auxiliary substrate, and assembling a backlight
module on a lower surface of the array substrate                   — S04
```

FIG. 3

SPLICED DISPLAY AND MENUFACTURING METHOD THEREOF

RELATED APPLICATIONS

The present application is a National Phase of International Application Number PCT/CN2017/116004, filed Dec. 13, 2017, and claims the priority of China Application No. 201711040923.X, filed Oct. 31, 2017.

BACKGROUND OF THE INVENTION

1. Field of the Invention

The disclosure relates to a spliced display technical field, and more particularly to a spliced display and a manufacturing method thereof.

2. The Related Arts

With the rapid development of large-size LCD (liquid crystal display)/AMOLED (active-matrix organic light emitting diode) panels or the like, LCD/AMOLED displays have gradually become mainstream of display technology due to their slimness, light weight, no radiation, stable performance and many other advantages. The current large-size LCD/AMOLED may be made with 60 to 100 inches, but still difficult to meet the requirements of some special occasions (such as monitoring, scheduling, etc.), and the yield of the large-size LCD/AMOLED panel is difficult to guarantee.

The existing LCD/AMOLED panel inevitably has an undisplayable area around the display image due to the requirements of the wiring arrangement of the surrounding circuits, a plastic bezel or an encapsulation design. The undisplayable area is called a bezel. The presence of the bezel causes the images to be divided when splicing, the continuity and integrity of the image is damaged, and the manufacturing precision problems, such as cutting, attaching, etc., exists when each layer of the display is manufactured at the same time, thereby seriously affecting the effect of splicing.

SUMMARY

In view of the deficiencies in the prior art, the disclosure provides a spliced display and a manufacturing method thereof, so as to reduce the split screen at the spliced part of the spliced display and ensure the spliced display with a flat surface.

In order to achieve the above object, the disclosure adopts the following technical schemes.

A spliced display, including an array substrate with a plurality of spliced arrangement, a functional layer assembly arranged on the array substrate with a plurality of spliced arrangement for displaying images, and a first transparent functional layer arranged on an outer surface of the functional layer assembly, wherein a projection of at least one of the first functional layer on the array substrate covers a plurality of the array substrates.

As an embodiment, all the array substrates share one of the first functional layers, and a projection of the first functional layer on the array substrate covers all the array substrates.

As an embodiment, the first functional layer is one or more of a polarizer, an anti-reflection layer, a cover glass and a touch screen.

As an embodiment, the functional layer assembly includes a color film substrate arranged spaced from and opposite to the array substrate.

As an embodiment, the number of the color film substrates is one, and the color film substrate is arranged opposite to all the array substrates.

Alternatively, the functional layer assembly includes a light emitting layer and an encapsulation layer with the same number as that of the array substrates, and a layer of light emitting layer is arranged immediately above each of the array substrates, the encapsulation layer is encapsulated over all the light-emitting layers.

As an embodiment thereof, a binding end of the array substrate located at an edge of the spliced display is arranged at an end of a spliced part far away from two of the array substrates.

As an embodiment thereof, the spliced display further includes an integrated substrate and a backlight module, wherein all the array substrates are fixed on an upper surface of the integrated substrate, and the backlight module is attached to a lower surface of the integrated substrate, so as to provide a backlight source for all the functional layer assembly.

Another object of the disclosure is to provide a manufacturing method of a spliced display, including:

manufacturing a plurality of array substrates, a functional layer assembly and a layer of a first transparent functional layer respectively;

fixing the array substrates on an upper surface of an auxiliary substrate for splicing and arranging the functional layer assembly on the spliced array substrates;

attaching the first functional layer on an outer surface of the functional layer assembly and making a projection of the first functional layer on the array substrates to cover all the array substrates;

removing the auxiliary substrate.

As an embodiment thereof, before the arranging the functional layer assembly on the spliced array substrates, an integrated substrate is arranged between the array substrate and the auxiliary substrate, and a bonding strength between the integrated substrate and the array substrate is greater than a bonding strength between the integrated substrate and the auxiliary substrate.

In the disclosure, the independent assembly belonging to each screen in the spliced display are separately manufactured and assembled, and then the assembled single-layer or multi-layer independent parts are attached on the auxiliary substrate in the splicing manner. Then, the common assembly made of common assembly is assembled on an independent part. After the auxiliary substrate is removed, the backlight module is assembled in the original. Since the spliced display adopts a whole layer of public parts toward the viewer's surface, the splitting feeling of the spliced display may be reduced and the flat display surface of the spliced display may be ensured.

BRIEF DESCRIPTION OF THE DRAWINGS

FIG. 2 is a schematic view of a manufacturing process of a spliced display according to embodiment I of the disclosure;

FIG. 3 is a main manufacturing flowchart of a spliced display according to embodiment I of the disclosure;

DETAILED DESCRIPTION OF THE PREFERRED EMBODIMENTS

In order to make the objectives, technical schemes and advantages of the disclosure more comprehensible, the disclosure is further described in detail below with reference to the accompanying drawings and embodiments. It should be understood that the specific embodiments described herein are merely used to explain the disclosure, and are not intended to limit the disclosure.

Figure 1A:
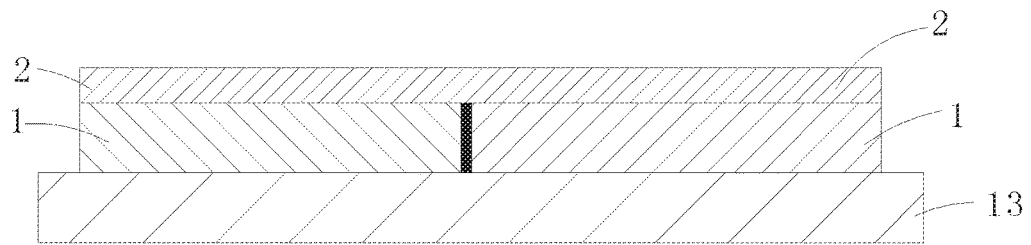
FIG. 1a is a schematic structural view of a spliced display of the disclosure.

Refer to FIG. 1a, a spliced display according to the disclosure is formed by splicing display units corresponding to a plurality of display areas, and the structural part of each display unit is mainly divided into two different types according to manufacturing processes. One type is a display unit of each display area having independent structural parts 1, and the independent structural parts 1 of the each of the display units are separately manufactured and assembled, and the independent structural parts 1 do not interfere with each other; the other type is the common structural parts 2 common to the display units in the respective display area, and a plurality of display units share the same common structural parts 2 to achieve the same function. Here, take all display units sharing the same common structural parts 2 as an example to illustrate.

As shown in FIG. 1a, a plurality of rows of independent structural parts 1 of the spliced display are arranged adjacent to each other. The common structural parts 2 are arranged on an upper surface of all the independent structural parts 1 in a stacked manner. The light emitted by each of independent structural parts 1 is emitted after being processed by the common structural parts 2.

The independent structural parts 1 may be array substrates, and may be array substrates and color film substrates, or array substrates with an OLED (organic light emitting diode) light emitting layer. The common structural parts 2 may be one or more of a polarizer, a cover glass (CG), a touch screen, and the like, and may also be one or more of an encapsulation layer of an AMOLED display, a circular polarizer, an anti-reflection layer and the like. Of course, the independent structural parts 1 and the common structural parts 2 are not limited to the above-mentioned structures, but may be other possible structures in the display. As shown in FIG. 1c, an upper surface of the independent structural parts 1 has two layers of the common structural part 2 with different functions. The two common structural parts 2 are attached together by an adhesive layer T. Here, the common structural parts 2 of the inner layer is a polarizer, and the common structural parts 2 of the outer layer is a cover glass or a touch screen.

Since each display unit has a respective independent structural part 1, all the display units share one common structural part 2, so that each independent structural parts 1 may be manufactured separately when the spliced display is manufactured. The shared common structural parts 2 may be integrally formed. Then the auxiliary substrate 13 may be used as an assembly platform, the independent structural parts 1 are respectively fixed side by side to corresponding parts to achieve relative fixation of the position of the independent structural parts 1, and then the common structural parts 2 are flatly assembled to all the surfaces of the independent structural parts 1 through attaching, packaging, etc., and finally the auxiliary substrate 13 is removed, that is, the assembling process between the common structural parts 2 and the respective independent structural parts 1 is completed.

Figure 1B:
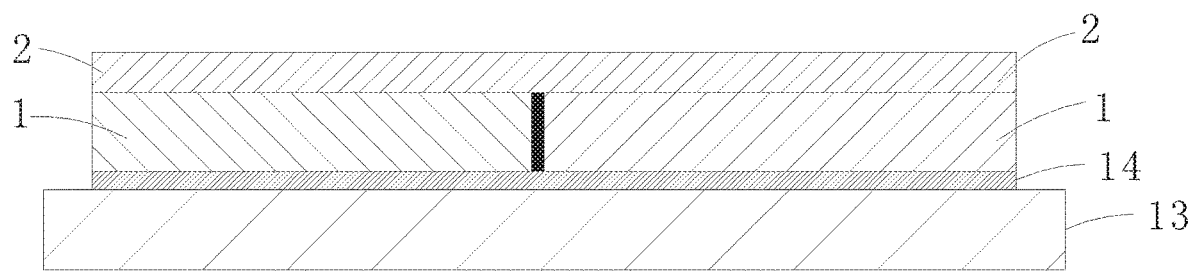
FIG. 1b is a schematic structural view of another spliced display according to the disclosure.
Figure 1C:
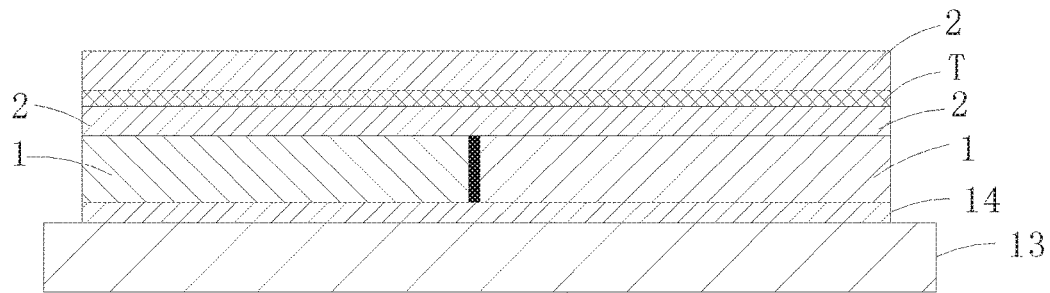
FIG. 1c is a schematic structural view of yet another spliced display according to the disclosure.

As shown in FIGS. 1b and 1c, different from FIG. 1a, an integrated substrate 14 is fixed on the bottom surface of the independent structural parts 1 in FIGS. 1b and 1c. After each independent structural part 1 is fixed as a whole by the integrated substrate 14, and fixed to an upper surface of the auxiliary substrate 13. Between the independent structural part 1 and the integrated substrate 14, between the integrated substrate 14 and the auxiliary substrate 13, fixation may be achieved by various fixing means, for example, affixing, vacuum attaching, electrostatic adherence, or the like. Wherein, the bonding strength between the integrated substrate 14 and an upper independent structural part 1 is greater than the bonding strength between the integrated substrate 14 and the lower auxiliary substrate 13. After completing the attachment of the common structural parts 2, the bonding state between the bonding between the independent structural part 1 and the integrated substrate 14, when the auxiliary substrate 13 is removed, will not be affected, so as to ensure the manufacturing reliability.

Embodiment I

As shown in FIG. 2, a spliced display of the embodiment includes an array substrate 11a with a plurality of spliced arrangements, a functional layer assembly arranged on the array substrate 11a with a plurality of spliced arrangement for displaying images, and a first transparent functional layer 12 arranged on an outer surface of the functional layer assembly, wherein a projection of at least one of the first functional layer 12 on the array substrate 11a covers a plurality of the array substrates 11a. Here, the number of the first functional layers 12 is one. All the array substrates 11a share one of the first functional layers 12, and a projection of the first functional layer 12 on the array substrate 11a covers all the array substrates 11a.

Figure 4:
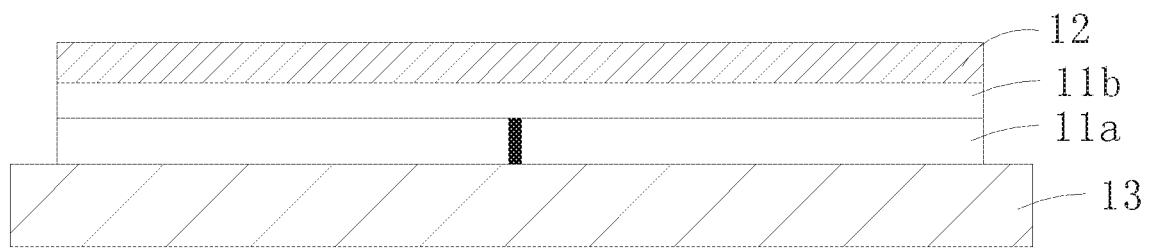
FIG. 4 is a schematic structural view of another spliced display according to embodiment I of the disclosure.

FIGS. 2 and 4 show a case when the display device is a liquid crystal display, the functional layer assembly includes a color film substrate 11b arranged spaced from and opposite to the array substrate 11a. In FIG. 3, the functional layer assembly includes a plurality of color film substrates arranged side-by-side. The display unit corresponding to each display area has one independent color film substrate 11b. Each color film substrate 11b in each display unit is respectively opposite to the one array substrate 11a under the color film substrate 11b. The liquid crystal is filled between the color film substrate 11b and the array substrate 11a. The first functional layer 12 is a polarizer. In other embodiments, the first functional layer 12 may also be one or more of an anti-reflective layer, a cover glass and a touch screen. For example, a layer of a cover glass or a touch screen may be attached over a common polarizer. Of course, the functional layer assembly may also include structural parts such as sealant and circuit wiring or the like besides the color film substrate 11b.

In combination with FIGS. 2 and 3, a manufacturing method of a spliced display according to the embodiment mainly includes:

S01: manufacturing a plurality of array substrates 11a, respective structural part of a functional layer assembly and a layer of a first transparent functional layer 12 respectively;

S02: fixing the array substrates 11a on an upper surface of an auxiliary substrate 13 for splicing and arranging the functional layer assembly on the spliced array substrates 11a. The step specifically includes: making the color film substrate 11b opposite to the corresponding array substrate 11a below to achieve assembling and fixation of independent parts of each of the display unit;

S03: attaching the first functional layer 12 on an outer surface of the functional layer assembly and making a projection of the first functional layer 12 on the array substrates to cover all the array substrates to achieve assembling and fixation of each of the common structural parts of the respective display unit;

S04: removing the auxiliary substrate 13, and assembling a backlight module 20 on a lower surface of the array substrate 11a to complete the splicing process of the display. Here, the backlight module 20 is generally attached below the array substrate 11a by an adhesive way.

In the embodiment, both of the array substrate 11a and the color film substrate 11b in the functional layer assembly serve as independent structural parts 1 included in each display unit of the display area, and only the first functional layer 12 serves as common structural parts 2 shared by the display units in the respective display area.

As shown in FIG. 4, FIG. 4 is a schematic structural diagram of another spliced display according to the embodiment. In the embodiment, only the array substrate 11a is used as the independent structural parts 1 included in each display unit of the respective display area. The first functional layer 12 and the color film substrate 11b in the functional layer assembly serve as common structural parts 2 shared by the display units in the respective display area. That is, the number of the color film substrates 11b in the spliced display is one, and the color film substrate 11b is arranged opposite to all the array substrates 11a. When manufacturing of the spliced display, the array substrate 11a of each display unit is first manufactured into a separate structural part respectively, and the color film substrate 11b of each display unit is manufactured into a common entirety. The first functional layer 12 of each display unit is manufactured into a common entirety. Then each array substrate 11a is fixed on an upper surface of the auxiliary substrate 13 for splicing. Other structural parts of the functional layer assembly are arranged on the spliced array substrate 11a. Finally, the entire color film substrate 11b is simultaneously are arranged opposite to the lower array substrates 11a, and the first functional layer 12 is attached to the outer surface of the functional layer assembly. The auxiliary substrate 13 is then removed, and the backlight module 20 is assembled on the lower surface of the array substrate 11a.

Figure 5:
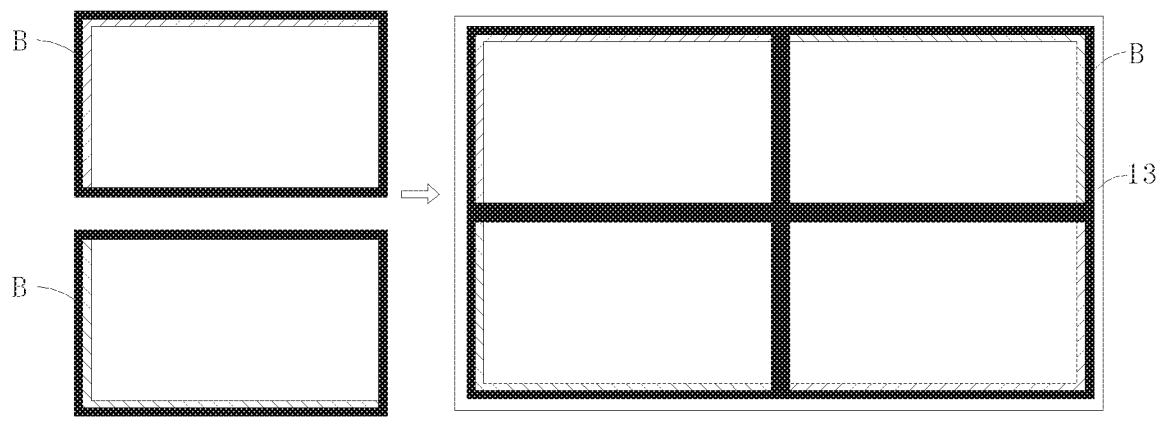
FIG. 5 is a schematic view of a splicing process of the spliced display according to the embodiment I of the disclosure.

Further, as shown in FIG. 5, in the embodiment, the binding ends B on the array substrates 11a at the edge of the spliced display are arranged at the ends of the spliced portions away from the two array substrates 11a. Since the bonding ends for bonding the chips or FPC (Flexible Printed Circuit Board) is arranged at a side near the edge of the spliced display, the middle splicing gap is narrowed to ensure the continuity and integrity of images and improve the users' viewing experience.

Embodiment II

Figure 6:
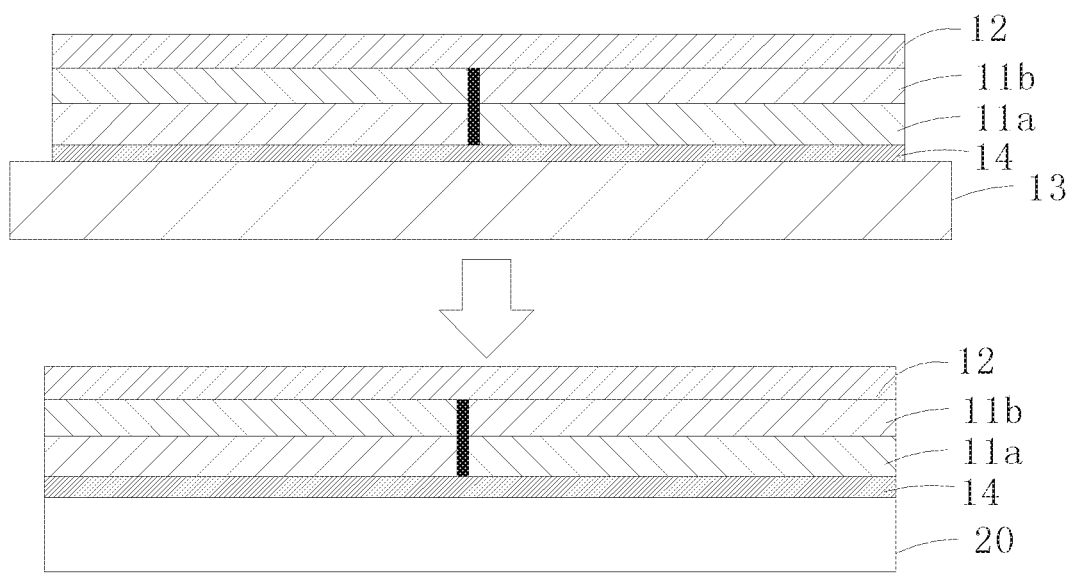
FIG. 6 is a schematic view of a main manufacturing process of a spliced display according to embodiment II of the disclosure.

As shown in FIG. 6, different from Embodiment I, the spliced display of the embodiment further includes an integrated substrate 14 and a backlight module 20, and all the array substrates 11a are fixed on an upper surface of the integrated substrate 14, and a backlight module 20 is attached to a lower surface of the integrated substrate 14 to provide backlight for all the functional layer assembly.

Specifically, in the manufacturing of a spliced display, an integrated substrate 14 is arranged on the bottom of the array substrate 11a, the respective array substrate 11a is spliced, the color film substrate 11b and the respective independent array substrate 11a below are aligned and assembled, and the first functional layer 12 is arranged on the spliced color film substrate 11b.

The integrated substrate 14 serves as a fixed carrier for each spliced display unit and integrates the respective spliced display units into an entirety, and the entirety is fixed to the auxiliary substrate 13. The bonding strength between the integrated substrate 14 and the array substrate 11a is greater than the bonding strength of the integrated substrate 14 and the auxiliary substrate 13, so that the spliced display unit still maintains a stable spliced state when the auxiliary substrate 13 is removed.

Embodiment III

Figure 7:
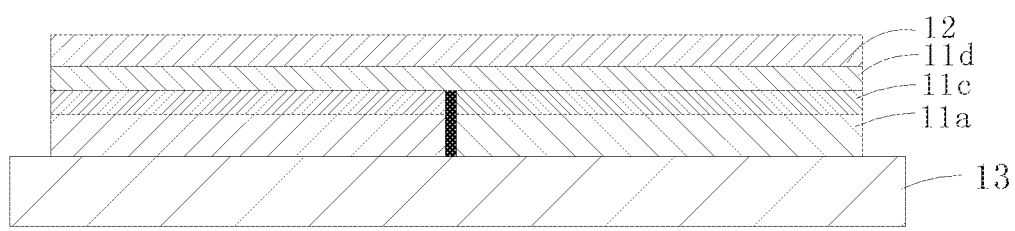
FIG. 7 is a schematic structural view of a spliced display according to embodiment III of the disclosure.
Figure 8:
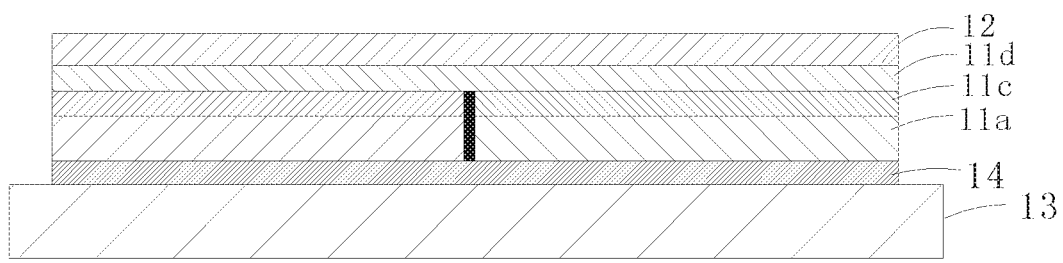
FIG. 8 is a schematic structural view of yet another spliced display according to embodiment III of the disclosure.

As shown in FIGS. 7 and 8, FIGS. 7 and 8 show a spliced structure of a display when the display is an AMOLED display. In the embodiment, the functional layer assembly includes the array substrate 11a, in addition, also includes a light-emitting layer 11c and a layer of a packaging layer 11d with a number consistent with that of the array substrates 11a. A layer of a light-emitting layer 11c is arranged immediately above each of the array substrates 11a. An encapsulation layer 11d is encapsulated over all the light-emitting layers 11c.

In this case, the first functional layer 12 is a circular polarizer, and may also be one or more of an anti-reflection layer, a cover glass and a touch screen. For example, a cover glass or a touch screen may be attached to the surface over the common circular polarizer.

In the embodiment, both of the array substrate 11a and a light-emitting layer 11c in the functional layer assembly serve as independent structural parts 1 common in the display unit of the respective display area. The functional layer 12 and the encapsulation layer 11d in the functional layer assembly serve as common structural parts 2 of the display unit of the respective display area. The array substrate 11a and the light-emitting layer 11c of each display unit are manufactured separately. The first functional layer 12 of each display unit is manufactured as one piece, and the encapsulation layer 11d is manufactured as one piece.

In the disclosure, the independent assembly belonging to each screen in the spliced display are separately manufactured and assembled, and then the assembled single-layer or multi-layer independent parts are attached on the auxiliary substrate in the splicing manner. Then, the common assembly made of common assembly is assembled on an independent part. After the auxiliary substrate is removed, the backlight module is assembled in the original. Since the spliced display adopts a whole layer of public parts toward the viewer's surface, the splitting feeling of the spliced display may be reduced and the flat display surface of the spliced display may be ensured.

The above descriptions are merely specific embodiments of the present application. It should be noted that those skilled in the art may make some improvements and modifications without departing from the principle of the present application. These improvements and modifications should also be regarded as within the protection scope of this application.

What is claimed is:

1. A spliced display, comprising an array substrate with a plurality of spliced arrangement, a functional layer assembly arranged on the array substrate with a plurality of spliced arrangement for displaying images, and a first transparent functional layer arranged on an outer surface of the functional layer assembly, wherein a projection of at least one of the first functional layer on the array substrate covers a plurality of the array substrates.

2. The spliced display according to claim 1, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

3. The spliced display according to claim 1, wherein all the array substrates share one of the first functional layers, and a projection of the first functional layer on the array substrate covers all the array substrates.

4. The spliced display according to claim 3, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

5. The spliced display according to claim 3, wherein the first functional layer is one or more of a polarizer, an anti-reflection layer, a cover glass and a touch screen.

6. The spliced display according to claim 5, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

7. The spliced display according to claim 5, wherein the functional layer assembly comprises a color film substrate arranged spaced from and opposite to the array substrate.

8. The spliced display according to claim 7, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

9. The spliced display according to claim 7, wherein the number of the color film substrates is one, and the color film substrate is arranged opposite to all the array substrates.

10. The spliced display according to claim 9, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

11. The spliced display according to claim 5, wherein the functional layer assembly comprises a light emitting layer and an encapsulation layer with the same number as that of the array substrates, and a layer of light emitting layer is arranged immediately above each of the array substrates, the encapsulation layer is encapsulated over all the light-emitting layers.

12. The spliced display according to claim 11, further comprising an integrated substrate and a backlight module, wherein all the array substrates are fixed on an upper surface of the integrated substrate, and the backlight module is attached to a lower surface of the integrated substrate, so as to provide a backlight source for all the functional layer assembly.

13. The spliced display according to claim 5, wherein a binding end of the array substrate located at an edge of the spliced display is arranged at an end of a spliced part far away from two of the array substrates.

14. The spliced display according to claim 13, further comprising an integrated substrate and a backlight module, wherein all the array substrates are fixed on an upper surface of the integrated substrate, and the backlight module is attached to a lower surface of the integrated substrate, so as to provide a backlight for all the functional layer assembly.

15. A manufacturing method of a spliced display, comprising:
   manufacturing a plurality of array substrates, a functional layer assembly and a layer of a first transparent functional layer respectively;
   fixing the array substrates on an upper surface of an auxiliary substrate for splicing and arranging the functional layer assembly on the spliced array substrates;
   attaching the first functional layer on an outer surface of the functional layer assembly and making a projection of the first functional layer on the array substrates to cover all the array substrates; and
   removing the auxiliary substrate.

16. The manufacturing method of the spliced display according to claim 15, wherein before the arranging the functional layer assembly on the spliced array substrates, an integrated substrate is arranged between the array substrate and the auxiliary substrate, and a bonding strength between the integrated substrate and the array substrate is greater than a bonding strength between the integrated substrate and the auxiliary substrate.

17. The manufacturing method of the spliced display according to claim 15, wherein the first functional layer is one or more of a polarizer, an anti-reflection layer, a cover glass and a touch screen.

18. The manufacturing method of the spliced display according to claim 17, wherein the functional layer assembly comprises a light emitting layer and an encapsulation layer with the same number as that of the array substrates, and a layer of light emitting layer is arranged immediately above each of the array substrates, the encapsulation layer is encapsulated over all the light-emitting layers.

* * * * *